US012431097B2

(12) United States Patent
Kim et al.

(10) Patent No.: US 12,431,097 B2
(45) Date of Patent: Sep. 30, 2025

(54) DISPLAY DEVICE AND DRIVING METHOD THEREOF

(71) Applicant: Samsung Display Co., LTD., Yongin-si (KR)

(72) Inventors: Jung Taek Kim, Yongin-si (KR); Yoon Sup Kim, Yongin-si (KR); Seung Ho Park, Yongin-si (KR); Joon Suk Baik, Yongin-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

(21) Appl. No.: 18/589,875

(22) Filed: Feb. 28, 2024

(65) Prior Publication Data

US 2025/0006138 A1 Jan. 2, 2025

(30) Foreign Application Priority Data

Jun. 29, 2023 (KR) ........................ 10-2023-0084444

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2300/0819* (2013.01); *G09G 2300/0842* (2013.01); *G09G 2300/0866* (2013.01); *G09G 2310/0275* (2013.01); *G09G 2310/08* (2013.01); *G09G 2330/021* (2013.01)

(58) Field of Classification Search
CPC ................... G09G 3/3291; G09G 3/32; G09G 2300/0819; G09G 2300/0842; G09G 2300/0866; G09G 2310/0275; G09G 2310/08; G09G 2330/021
USPC .......................................................... 345/204
See application file for complete search history.

(56) References Cited

U.S. PATENT DOCUMENTS

| | | | | |
|---|---|---|---|---|
| 9,165,518 B2 | 10/2015 | Choi et al. | |
| 11,049,474 B2 | 6/2021 | Kim et al. | |
| 11,087,694 B2 | 8/2021 | Park | |
| 11,605,331 B2 | 3/2023 | Pyun et al. | |
| 2006/0066251 A1* | 3/2006 | Sim | G09G 3/3233 315/169.3 |
| 2016/0365037 A1* | 12/2016 | Gu | G09G 3/3258 |
| 2017/0061877 A1* | 3/2017 | Lee | G09G 3/3233 |

(Continued)

FOREIGN PATENT DOCUMENTS

| | | |
|---|---|---|
| KR | 10-1954934 B1 | 3/2019 |
| KR | 10-2020-0104453 A | 9/2020 |

(Continued)

*Primary Examiner* — Tom V Sheng
(74) *Attorney, Agent, or Firm* — Innovation Counsel LLP

(57) ABSTRACT

A display device includes a pixel that has a first transistor having a drain electrode that is connected to a first power voltage node and a source electrode that is connected to a second power voltage node, a second transistor connected between a data line and a gate electrode of the first transistor, and a third transistor connected between a sensing line and the source electrode of the first transistor, a data driver applying a bias voltage to the data line during a sensing period, a sensing driver sensing an electrical characteristic of the pixel through the sensing line during the sensing period, and a controller for adjusting the bias voltage according to the first power voltage according to input image data.

18 Claims, 9 Drawing Sheets

(56) References Cited

U.S. PATENT DOCUMENTS

| | | | | |
|---|---|---|---|---|
| 2018/0166020 A1* | 6/2018 | Hwang | G09G 3/3233 | |
| 2018/0190196 A1* | 7/2018 | Kwon | H10K 59/35 | |
| 2020/0013345 A1* | 1/2020 | Jeong | G09G 3/3291 | |
| 2021/0065628 A1* | 3/2021 | Kim | G09G 3/3233 | |
| 2022/0309985 A1* | 9/2022 | Pyun | G09G 3/2007 | |
| 2023/0162655 A1 | 5/2023 | Choi et al. | | |
| 2023/0178031 A1* | 6/2023 | Chung | G09G 3/3291 | |
| 2023/0186831 A1* | 6/2023 | Pyun | G09G 3/3225 | 345/55 |
| 2023/0215327 A1* | 7/2023 | Pyun | G09G 3/2007 | 345/55 |
| 2024/0112630 A1* | 4/2024 | Bae | G09G 3/3233 | |

FOREIGN PATENT DOCUMENTS

| | | | |
|---|---|---|---|
| KR | 10-2022-0042747 | A | 4/2022 |
| KR | 10-2022-0134806 | A | 10/2022 |
| KR | 10-2520563 | B1 | 4/2023 |
| KR | 10-2023-0074363 | A | 5/2023 |

* cited by examiner

FIG. 7

LUT

| Ids \ VDD | VDD1 | VDD2 | VDD3 | VDD4 | ... | ... | ... | ... | ... | VDDn |
|---|---|---|---|---|---|---|---|---|---|---|
| Ids1 | VREF_TL1 | VREF_TL2 | VREF_TL3 | ... | ... | ... | ... | ... | ... | ... |
| Ids2 | VREF_TL21 | VREF_TL22 | ... | ... | ... | ... | ... | ... | ... | ... |
| Ids3 | ... | ... | ... | ... | ... | ... | ... | 7 | ... | 5 |
| Ids4 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| Idsm | ... | ... | ... | ... | ... | ... | ... | ... | ... | VREF_TLmn |

VREF_TL

DISPLAY DEVICE AND DRIVING METHOD THEREOF

CROSS-REFERENCE TO RELATED APPLICATION

The present application claims priority, under 35 U.S.C. § 119(a), to Korean patent application No. 10-2023-0084444 filed on Jun. 29, 2023 in the Korean Intellectual Property Office, the entire disclosure of which is incorporated herein by reference.

BACKGROUND

1. Technical Field

The present disclosure generally relates to a display device, and more particularly, to a display device and a driving method that can compensate for a sensing error according to a change in power voltage when sensing is performed in real time.

2. Related Art

With the development of information technologies, the importance of a display device that connects a user to information increases. Accordingly, display devices such as a liquid crystal display device and an organic light emitting display device are increasingly used.

A display device includes pixels, and each of the pixels includes a light emitting element and a driving transistor for supplying a driving current to the light emitting element. The pixels may be degraded as time elapses, and characteristics of threshold voltage and mobility of the driving transistor included in the pixel may be changed. Accordingly, a technique for sensing characteristic information of the pixels (e.g., the driving transistor) through an external compensation circuit is used for the display device.

The above information disclosed in this Related Art section is only for enhancement of understanding of the background of the disclosure and therefore it may contain information that does not form the prior art that is already known in this country to a person of ordinary skill in the art.

SUMMARY

Embodiments provide a display device capable of performing sensing with improved reliability. For example, the display device can prevent or at least reduce an error in sensing data caused by a power voltage change that happens according to an input image.

Embodiments also provide a driving method of the display device.

In accordance with an aspect of the present disclosure, there is provided a display device including: a pixel including a first transistor having a drain electrode that is connected to a first power voltage node and a source electrode that is connected to a second power voltage node, a second transistor connected between a data line and a gate electrode of the first transistor, and a third transistor connected between a sensing line and the source electrode of the first transistor; a data driver connected to the pixel through the data line, the data driver applying a bias voltage to the data line during a sensing period of a frame period, wherein the frame period includes the sensing period and a display period; a sensing driver connected to the pixel through the sensing line, the sensing driver sensing an electrical characteristic of the pixel through the sensing line during the sensing period; and a controller configured to control a first power voltage for the frame period according to input image data, and adjust the bias voltage according to the first power voltage.

The display device may further include a memory configured to store target voltage levels respectively corresponding to one or more reference voltage levels within a predetermined voltage range.

The controller may select a first reference voltage level (among one or more reference voltage levels) based on a level of the first power voltage, and adjust the bias voltage to have a first target voltage level corresponding to the first reference voltage level among target voltage levels.

The controller may control a level of the first power voltage for a next frame period of the frame period according to next input image data of the input image data, and adjust the bias voltage applied to the data line during the sensing period of the next frame period according to the level of the first power voltage for the next frame period.

The controller may select a second reference voltage level that correlates with the level of the first power voltage for the next frame period among the one or more reference voltage levels, and adjust the bias voltage to have a second target voltage level corresponding to the second reference voltage level among the target voltage levels.

The second reference voltage level may be different from the first reference voltage level, and the second target voltage level may be different from the first target voltage level.

The one or more reference voltage levels and the target voltage levels may be stored in the form of a lookup table in the memory.

A first value may be sensed as the electrical characteristic of the pixel through the sensing line when the first power voltage has a first reference voltage level among reference voltage levels and the bias voltage has a first target voltage level corresponding to the first reference voltage level among target voltage levels. A second value may be sensed as the electrical characteristic of the pixel through the sensing line when the first power voltage has a second reference voltage level among the reference voltage levels and the bias voltage has a second target voltage level corresponding to the second reference voltage level among the target voltage levels. The first value and the second value may be the same.

The one or more reference voltage levels and the target voltage levels may be stored in the form of a lookup table with respect to a specific value sensed as the electrical characteristic in the memory.

The lookup table may be updated for each predetermined cycle.

The data driver may supply a data voltage corresponding to the input image data to the pixel in the display period.

In accordance with another aspect of the present disclosure, there is provided a method of driving a display device that includes a pixel including a first transistor having a drain electrode that is connected to a first power voltage node and a source electrode that is connected to a second power voltage node, a second transistor connected between a data line and a gate electrode of the first transistor, and a third transistor connected between a sensing line and the source electrode of the first transistor, wherein the method includes: providing a first power voltage and a second power voltage respectively to the first power voltage node and the second power voltage node in a frame period, wherein the first power voltage for the frame period changes according to input image data, and the frame period includes a display period and a sensing period; applying a bias voltage to the data line during the sensing period; and sensing an electrical characteristic of the pixel through the sensing line during the sensing period, and adjusting the bias voltage according to the first power voltage.

The method may store target voltage levels respectively corresponding to one or more reference voltage levels within a predetermined voltage range.

The adjusting of the bias voltage may include: selecting a first reference voltage level based on a level of the first power voltage among one or more reference voltage levels; and controlling the bias voltage to have a first target voltage level corresponding to the first reference voltage level among target voltage levels.

The method may further include: controlling a level of the first power voltage for a next frame period of the frame period according to next input image data of the input image data; and adjusting the bias voltage applied to the data line during the sensing period of the next frame period according to the level of the first power voltage for the next frame period.

The adjusting of the bias voltage applied to the data line in the sensing period of the next frame period may include: selecting a second reference voltage level based on the level of the first power voltage for the next frame period among the one or more reference voltage levels; and adjusting the bias voltage to have a second target voltage level corresponding to the second reference voltage level among the target voltage levels.

The second reference voltage level may be different from the first reference voltage level, and the second target voltage level may be different from the first target voltage level.

A first value may be sensed as the electrical characteristic of the pixel through the sensing line when the first power voltage has a first reference voltage level among reference voltage levels and the bias voltage has a first target voltage level corresponding to the first reference voltage level among target voltage levels. A second value may be sensed as the electrical characteristic of the pixel through the sensing line when the first power voltage has a second reference voltage level among the reference voltage levels and the bias voltage has a second target voltage level corresponding to the second reference voltage level among the target voltage levels. The first value and the second value may be the same.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7 is a diagram illustrating an embodiment of a lookup table including levels of the first power voltage with respect to each sensing current and target voltage levels corresponding thereto.

DETAILED DESCRIPTION

Hereinafter, embodiments of the present disclosure will be described in more detail with reference to the accompanying drawings. In the description below, only a necessary part to understand an operation according to the present disclosure is described and the descriptions of other parts are omitted in order not to obscure subject matters of the present disclosure. In addition, the present disclosure is not limited to exemplary embodiments described herein, but may be embodied in various different forms. Rather, exemplary embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it can be directly connected or coupled to another element or be indirectly connected or coupled to another element with one or more intervening elements interposed therebetween. The technical terms used herein are used only for the purpose of illustrating a specific embodiment and not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Figure 1:
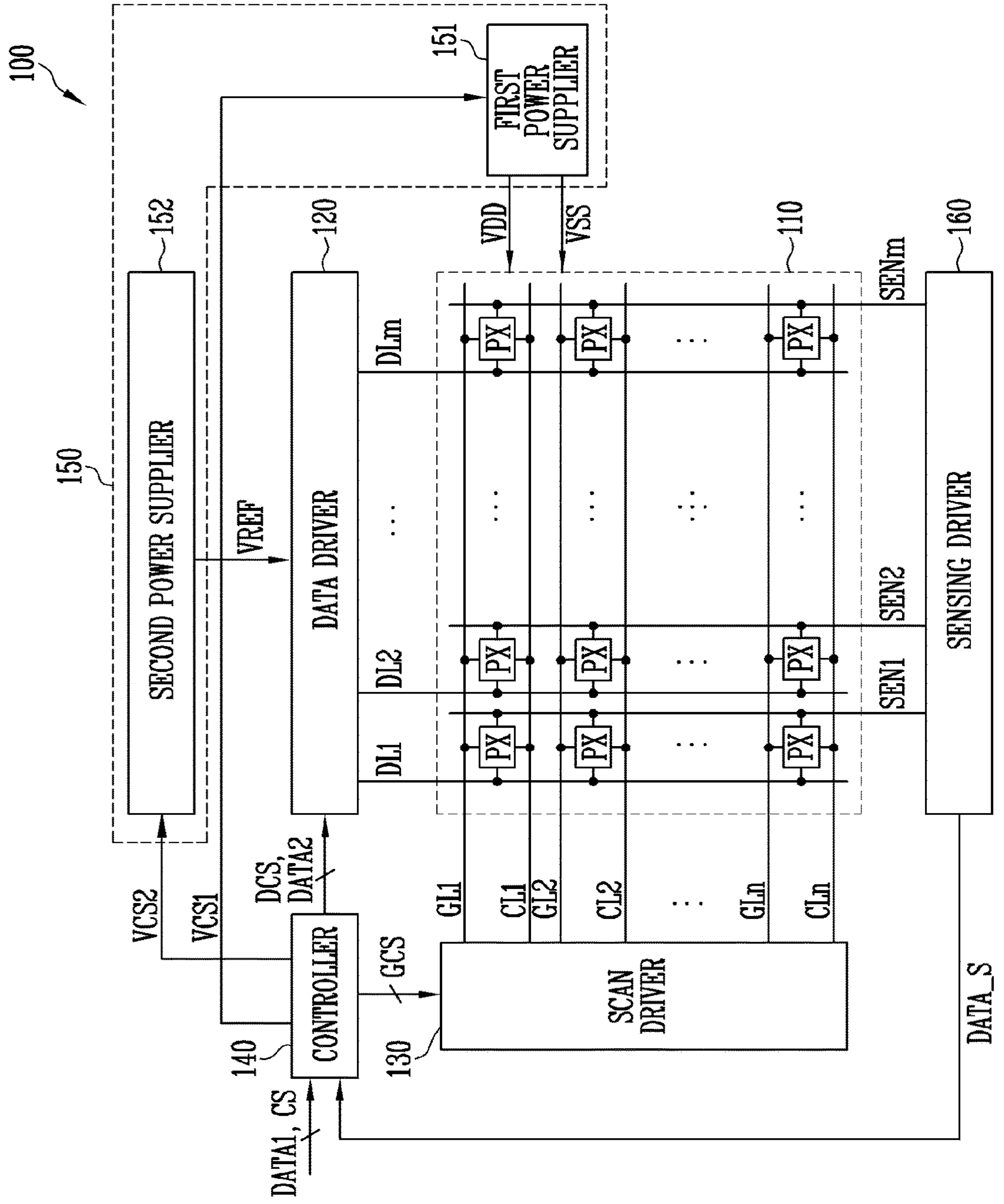
FIG. 1 is a block diagram illustrating a display device in accordance with an embodiment of the present disclosure.

FIG. 1 is a block diagram illustrating a display device in accordance with an embodiment of the present disclosure.

Referring to FIG. 1, the display device 100 may include a display panel 110, a data driver 120, a gate driver 130, a controller 140, a power supplier 150, and a sensing driver 160.

The display panel 110 may include data lines DL1 to DLm (m is a positive integer), gate lines GL1 to GLn (n is a positive integer), sensing lines SEN1 to SENm, control lines CL1 to CLn, and pixels PX.

The pixels PX may be disposed in areas partitioned by the data lies DL1 to DLm and the gate lines GL1 to GLn. The pixels PX may be electrically connected to the data lines DL1 to DLm and the sensing lines SEN1 to SENm. Also, the pixels PX may be electrically connected to the gate lines GL1 to GLn and the control lines CL1 to CLn.

Also, the pixels PX may be supplied with a first power voltage VDD, a second power voltage VSS, and a bias voltage VREF from the power supplier 150 which will be described later. The pixels PX may receive the first power voltage VDD and the second power voltage VSS, which are respectively provided through a first power voltage node and a second power voltage node. Also, the pixels PX may receive the bias voltage VREF provided through the data lines DL1 to DLm. The first power voltage VDD and the second power voltage VSS may be power voltages necessary for driving the pixels PX. In addition, the bias voltage VREF may be a sensing voltage for sensing a threshold voltage of a driving transistor included in each of the pixels PX. In the present disclosure, the bias voltage VREF may be designated as a sensing voltage applied to a gate electrode of the driving transistor to measure a characteristic of the driving transistor.

The data driver 120 may be supplied with a data control signal DCS and image data DATA2 from the controller 140, convert the image data (or digital image data) into an analog data signal (or data voltage), based on the data control signal DCS, and provide the data voltage (or data signal) to the data lines DL1 to DLm. The data control signal DCS is a signal for controlling an operation of the data driver 120, and may include a data enable signal, and the like. For example, the data driver 120 may provide the pixels PX with a data voltage (or data signal) corresponding to input image data through the data lines DL1 to DLm in a display period (e.g., an active period) of one frame. The data voltage is a voltage for displaying an effective image, and may be a value corresponding to image data (or digital image data).

The data driver 120 may apply the bias voltage VREF supplied from the power supplier 150 to the sensing lines SEN1 to SENm under the control of the controller 140. For example, the data driver 120 may provide the bias voltage VREF to the data lines DL1 to DLm in a sensing period (e.g., a vertical blank period) of the one frame.

The gate driver 130 (or scan driver) may generate a gate signal, based on a gate control signal GCS, and provide the gate signal to the gate lines GL1 to GLn. The gate control signal GCS is a signal for controlling an operation of the gate driver 130, and may include a start signal, clock signals, and the like. For example, the gate driver 130 may sequentially generate and output a gate signal corresponding to the start signal (e.g., a gate signal having a waveform identical or similar to a waveform of the start signal), using the clock signals. The gate driver 130 may include a shift register.

Also, the gate driver 130 may generate a control signal, based on the gate control signal GCS, and provide the control signal to the control lines CL1 to CLn. For example, the gate driver 130 may sequentially generate and output the control signal, using the clock signals. Although a case where the gate driver 130 generates the gate signal and the control signal has been illustrated, a circuit for generating the control signal may be implemented as a separate driver independent from the gate driver 130.

For example, the gate driver 130 may generate a gate signal (and a control signal) made up of a combination of a gate-on voltage VON and a gate-off voltage VOFF. The gate-on voltage VON may have a voltage level at which a transistor provided in each pixel PX, the gate driver 130, or the like is turned on, and the gate-off voltage VOFF may have a voltage level at which the transistor is turned off.

The controller 140 may receive a control signal CS from the outside (e.g., a graphic processor), and generate the gate control signal GCS and the data control signal DCS based on the control signal CS. Input image data DATA1 may include a gray value corresponding to each pixel PX, and the control signal CS may include a clock signal, a horizontal synchronization signal, a data enable signal, and the like.

Also, the controller 140 may receive the input image data DATA1 (e.g., RGB data) from the outside, and convert the input image data DATA1 into image data DATA2 corresponding to a pixel arrangement of the display panel 110 and then output the converted image data DATA2.

In accordance with an embodiment, the controller 140 may determine the first power voltage VDD and the second power voltage VSS of the display device 100, based on the input image data DATA1. For example, the controller 140 may determine a first voltage control signal VCS1, using a maximum data voltage for each frame, a current drop (IR-Drop) for each position, an energy margin (EL Margin), and the like, based on the input image data DATA1 provided at a present time. The first voltage control signal VCS1 is a voltage control signal for the first power voltage VDD and the second power voltage VSS, and may be provided to a first power supplier 151 in the power supplier 150. Besides, the controller 140 may determine the first power voltage VDD and/or the second power voltage VSS by using a frame period as a unit, based on various methods.

Also, the controller 140 may determine a second voltage control signal VCS2 applied to a data line according to a level of the first power voltage VDD. The second voltage control signal VCS2 is a voltage control signal for the bias voltage VREF, and may be provided to a second power supplier 152 in the power supplier 150.

The power supplier 150 may be configured with the first power supplier 151 which generates the first power voltage VDD and the second power voltage VSS and the second power supplier 152 which generates the bias voltage VREF.

The power supplier 150 may generate the first power voltage VDD and the second power voltage VSS and provide the first power voltage VDD and the second power voltage VSS to the display panel 110. For example, the power supplier 150 may generate the first power voltage VDD and the second power voltage VSS, which vary according to input image data, and provide the first power voltage VDD and the second power voltage VSS to the display panel 110.

The power supplier 150 may generate the bias voltage VREF to provide the bias voltage VREF to the data driver 120. In the sensing period, the data driver 120 may apply the bias voltage VREF to the data lines DL1 to DLm. In embodiments, the bias voltage VREF may have a voltage level lower than a voltage level of a threshold of a light emitting element. For example, the bias voltage VREF may be a voltage controlled based on the first power voltage provided to each pixel PX. In FIG. 1, it is illustrated that the first power supplier 151 and the second power supplier 152 are components distinguished from each other. However, embodiments are not limited thereto. For example, the first power supplier 151 and the second power supplier 152 may be integrated into one.

The sensing driver 160 may be connected to the sensing lines SEN1 to SENm, and sense deviation information of each of the sensing lines SEN1 to SENm. Referring to FIG. 1, it is illustrated that the sensing driver 160 is connected to the sensing lines SEN1 to SENm. However, the present disclosure is not limited thereto. For example, the sensing driver 160 may be connected to the data lines DL1 to DLm, which can be applied to various external compensation methods currently know in the art.

In the sensing period, the sensing driver 160 may sense characteristic information of the pixels PX. For example, when the bias voltage VREF is applied to the data lines DL1 to DLm, the sensing driver 160 may receive a value sensed from each pixel PX through the sensing lines SEN1 to SENm. More specifically, the sensing driver 160 may sense a charge voltage of a capacitor connected to each of the sensing lines SEN1 to SENm, thereby sensing characteristic information of the pixel PX including threshold voltage information and mobility information of a driving transistor included in the pixel PX and/or degradation information of a light emitting element included in the pixel PX. In another example, the sensing driver 160 may receive a charge voltage sensed from pixels PX on one horizontal line in a sensing period between adjacent display periods.

The sensing driver 160 may calculate a sensing current by converting the sensed charge voltage, and convert the characteristic information of the pixel PX, which includes the calculated sensing current, into sensing data DATA_S in a digital form and then provide the converted sensing data DATA_S to the controller 140. To this end, the sensing driver 160 may include an Analog-Digital Converter (ADC). The sensing data DATA_S output from the sensing driver 160 may be stored in a memory.

Each of the data driver 120, the gate driver 130, the controller 140, the power supplier 150, and the sensing driver 160 may be mounted directly on the display pane 110 in the form of at least one integrated circuit chip, be attached to the display panel 110 in the form of a tape carrier package (TCP), or be mounted on a separate printed circuit board.

Figure 2:
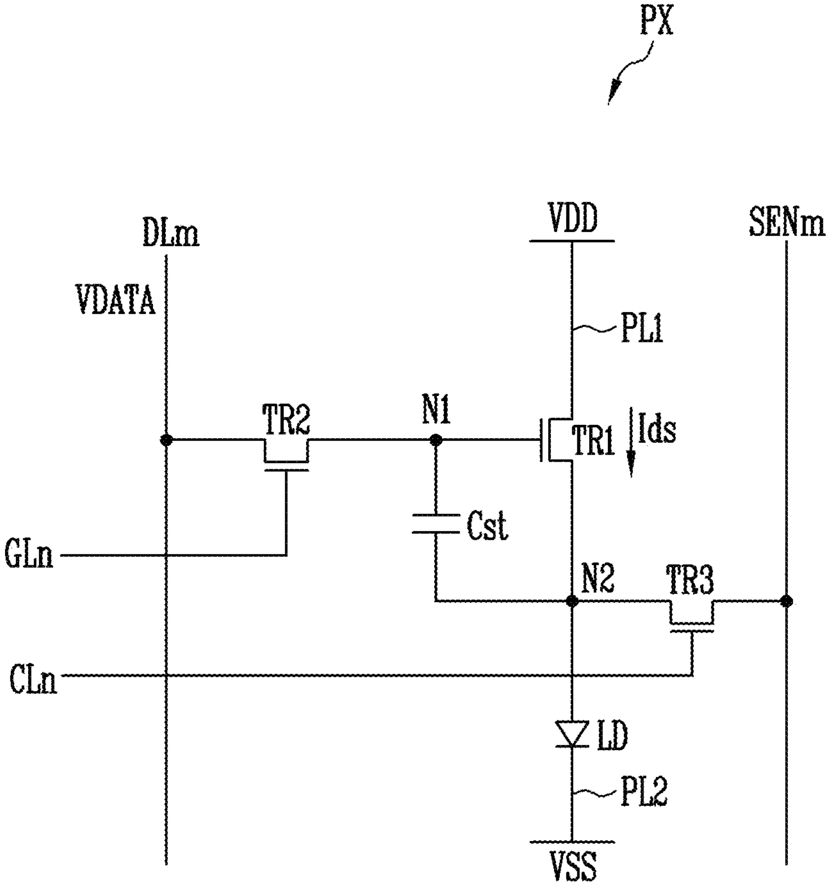
FIG. 2 is a circuit diagram illustrating an embodiment of a pixel included in the display device shown in FIG. 1.

FIG. 2 is a circuit diagram illustrating an embodiment of the pixel included in the display device shown in FIG. 1. A structure of the pixel included in the display device shown in FIG. 1 will be described with reference to FIG. 2.

Referring to FIG. 2, the pixel PX may include a light emitting element LD, a first transistor TR1 (or driving transistor), a second transistor TR2 (or switching transistor), a third transistor TR3 (or sensing transistor), and a storage capacitor Cst.

The light emitting element LD may generate light with a predetermined luminance, corresponding to an amount of current supplied from the first power voltage VDD through the first transistor TR1. The light emitting element LD may include a first electrode and a second electrode. The first electrode may be connected to a second node N2, and the second electrode may be connected to a second power line PL2 connected to a second power voltage node to which the second power voltage VSS is applied. In an embodiment, the first electrode may be an anode electrode, and the second electrode may be a cathode electrode. Alternatively, the first electrode may be the cathode electrode, and the second electrode may be the anode electrode.

In accordance with an embodiment, the light emitting element LD may be an inorganic light emitting element formed of an inorganic material or an organic light emitting diode including an organic light emitting layer. Also, the light emitting element LD may be a light emitting element made of a combination of an inorganic material and an organic material.

A first electrode of the first transistor TR1 may be connected to a first power line PL1 connected to a first power voltage node to which the first power voltage VDD is applied, and a second electrode of the first transistor TR1 may be connected to the first electrode of the light emitting element LD (or the second node N2). A gate electrode of the first transistor TR1 may be connected to a first node N1. The first electrode may be a drain electrode, and the second electrode may be a source electrode.

The first transistor TR1 may control a current flowing through the light emitting element LD, corresponding to a voltage of the first node N1. The first transistor TR1 may be turned on when a voltage (i.e., a gate-source voltage) between the first node N1 and the second node N2 is higher than a threshold voltage of the first transistor TR1.

A first electrode of the second transistor TR2 may be connected to an mth data line DLm, and a second electrode of the second transistor TR2 may be connected to the first node N1 (or the gate electrode of the first transistor TR1). A gate electrode of the second transistor TR2 may be connected to an nth gate line GLn. The second transistor TR2 may be turned on when a high level voltage is supplied to the nth gate line GLn, to transfer a data voltage VDATA from the mth data line DLm to the first node N1.

A first electrode of the third transistor TR3 may be connected to an mth sensing line SENm, and a second electrode of the third transistor T3 may be connected to the second node N2 (or the second electrode of the first transistor TR1). A gate electrode of the third transistor TR3 may be connected to an nth control line CLn. The third transistor TR3 may be turned on when a high level voltage is supplied to the nth control line CLn, to electrically connect the mth sensing line SENm and the second node N2 to each other. Accordingly, for a predetermined time, a sensing current Ids corresponding to an initialization voltage or a voltage of the second node N2 may be transferred to the second node N2 through the mth sensing line SENm. The sensing current Ids may be provided to the sensing driver 160 through the mth sensing line SENm.

The storage capacitor Cst may be connected between the first node N1 and the second node N2. The storage capacitor Cst may charge a data voltage VDATA corresponding to a data signal supplied to the first node N1 during one frame. Accordingly, the storage capacitor Cst may store a voltage corresponding to a voltage difference between the first node N1 and the second node N2. When the data voltage VDATA is supplied, the initialization voltage may be supplied to the second node N2, and accordingly, the storage capacitor Cst may store a voltage corresponding to a difference between the data voltage VDATA and the initialization voltage. Turn-on/turn-off of the first transistor TR1 may be determined according to the voltage stored in the storage capacitor Cst.

However, the circuit structure of the pixel PX shown in FIG. 2 is not limited thereto. For example, it is illustrated that the transistors shown in FIG. 2 is implemented with an NMOS transistor. However, at least one of the first to third transistors TR1, TR2, and TR3 may be implemented with a PMOS transistor, or be a thin film transistor including at least one of an oxide semiconductor, an amorphous silicon semiconductor, and a polycrystalline silicon semiconductor.

Figure 3:
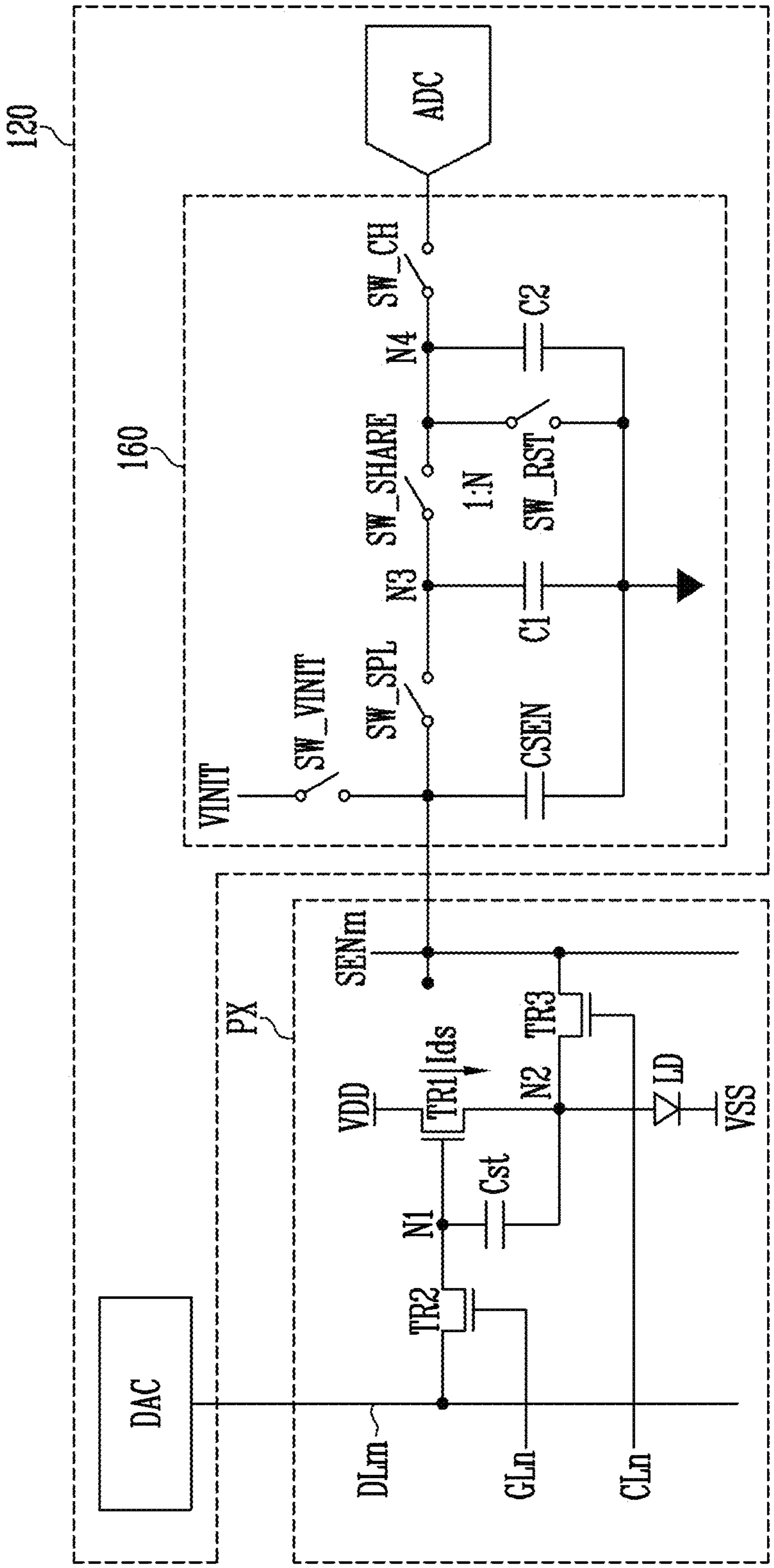
FIG. 3 is a circuit diagram illustrating an embodiment of a data driver included in the display device shown in FIG. 1.

FIG. 3 is a circuit diagram illustrating an embodiment of the data driver included in the display device shown in FIG. 1.

In FIG. 3, the data driver 120 is briefly illustrated based on a portion of the sensing driver 160 connected to a pixel PX through the mth sensing line SENm to sense a characteristic of the pixel PX. The pixel PX shown in FIG. 3 is identical to the pixel PX described with reference to FIG. 2, and therefore, descriptions of portions overlapping with those of the pixel PX shown in FIG. 2 will be omitted.

The data driver 120 may include a Digital-to-Analog Converter (DAC). The DAC may generate a data voltage VDATA corresponding to image data DATA of a frame. For example, the DAC may select one of gamma voltages, based on the image data DATA and output the selected gamma voltage as the data voltage VDATA. Meanwhile, the data driver 120 may further include an output buffer (not shown), and provide the data voltage VDATA to the mth data line DLm through the output buffer.

The data driver 120 may further include a sensing driver 160 connected to the mth sensing line SENm and an analog-to-digital converter (ADC).

The sensing driver 160 may include an initialization switch SW_VINIT, a sensing capacitor CSEN, a sampling switch SW_SPL, a first capacitor C1, a sharing switch SW_SHARE, a reset switch SW_RST, a second capacitor C2, and an output switch SW_CH. However, FIG. 3 illustrates an example of the sensing driver 160, and the present disclosure is not limited thereto. For example, when the sensing driver 160 can detect a voltage (or a current corresponding thereto) of the second node N2 of the pixel PX, the sensing driver 160 may be implemented with various circuits (e.g., a sensing circuit which converts a sensing current into a sensing voltage, using an amplifier, and sample and hold the converted sensing voltage).

Referring to FIG. 3, the initialization switch SW_VINIT may be connected between a power line to which an initialization voltage VINIT is applied and the mth sensing line SENm. The initialization voltage VINIT may be provided from the power supplier 150, and have a voltage level lower than a voltage level of a voltage at which the light emitting element LD can operate. When the initialization switch SW_VINIT is turned on, the initialization voltage VINIT may be applied to the mth sensing line SENm. When the third transistor TR3 of the pixel PX is turned on, the initialization voltage VINIT may be applied to the second node N2 of the pixel PX. Since the initialization voltage VINIT has a voltage level lower than the voltage level of the voltage at which the light emitting element LD can operate, the light emitting element LD may not emit light even when the first transistor TR1 is turned on.

The sensing capacitor CSEN may be connected between the mth sensing line SENm and a reference power source. The reference power source may have a ground voltage, but the present disclosure is not limited thereto. When the initialization switch SW_VINIT is turned off and the third transistor TR3 of the pixel PX is turned on, the sensing capacitor CSEN may be charged by a sensing current Ids provided through the second node N2 for a certain time. In particular, when the second transistor TR2 is turned on and the sampling switch SW_SPL is turned off for a certain time, the sensing capacitor CSEN may be charged by the sensing current Ids provided through the second node N2 from the bias voltage VREF applied to the first node N1. Characteristic information (e.g., characteristic information of the driving transistor) of the pixel PX, which is provided through the second node N2, may be stored in the voltage charged in the sensing capacitor CSEN.

The sampling switch SW_SPL may be connected between the mth sensing line SENm and a third node N3. The first capacitor C1 may be connected between the third node N3 and the reference power source. While the sampling switch SW_SPL is turned on, the first capacitor C1 may sample the characteristic information of the pixel PX (or the first transistor TR1), which is stored in the sensing capacitor CSEN. That is, the data driver 120 may sample a sensing signal through the sampling switch SW_SPL and the first capacitor C1.

The sharing switch SW_SHARE may be connected between the third node N3 and a fourth node N4, the reset switch SW_RST may be connected between the fourth node N4 and the reference power source, and the second capacitor C2 may be connected between the fourth node N4 and the reference power source. When the sharing switch SW_SHARE is turned on and the first capacitor C1 and the second capacitor C2 share charges, a node voltage of the fourth node N4 (and a node voltage of the third node N3) may be changed. The sharing switch SW_SHARE, the reset switch SW_RST, and the second capacitor C2 may serve as buffers according to operations of the sharing switch SW_SHARE and the reset switch SW_RST.

The output switch SW_CH may be connected between the fourth node N4 and the ADC. A node voltage of the fourth node N4 may be applied to the ADC.

The data driver 120 may convert the sampled sensing signal from an analog form to a digital form through the ADC. The sensing signal in the digital form may be provided to the controller 140.

Figure 4:
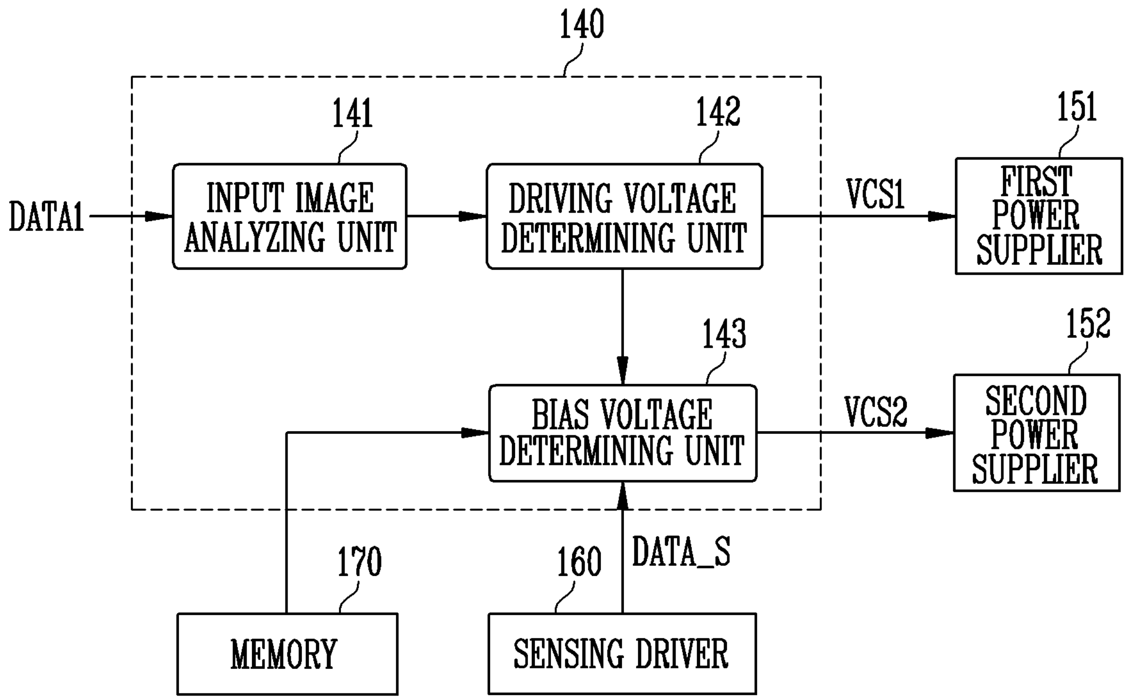
FIG. 4 is a block diagram illustrating an embodiment of a controller included in the display device shown in FIG. 1.

FIG. 4 is a block diagram illustrating an embodiment of the controller included in the display device shown in FIG. 1.

Referring to FIG. 4, the controller 140 may include an input image analyzing unit 141, a driving voltage determining unit 142, and a bias voltage determining unit 143.

In accordance with an embodiment, the controller 140 may determine a first power voltage VDD and a second power voltage VSS, based on input image data DATA1. In order to determine a power voltage, the controller 140 may receive input image data DATA1 by using a frame as a unit at a present time through the input image analyzing unit 141, and analyze the input image data DATA1 for each frame. For example, the controller 140 may analyze a maximum luminance Max Gray or analyze a histogram with respect to luminance data and gray data of each pixel PX, which are included in input image data DATA1 of each frame.

Also, the controller 140 may determine a first power voltage VDD and a second power voltage VSS, which are supplied to each pixel PX, through the driving voltage determining unit 142. The first power voltage VDD may be a high level voltage as compared with the second power voltage VSS. For example, when a fluctuation of the first input image data DATA1 is large, a level of the first power voltage VDD provided to each pixel PX does not have a constant value but may fluctuate in a large range. As a voltage drop occurs in the first power voltage VDD when the luminance of the input image data DATA1 is changed to the maximum luminance, the controller 140 may determine the first power voltage VDD as a minimum voltage level at which the driving transistor can operate in a saturation region. That is, the controller 140 may generate a first voltage control signal VCS1 by determining the first power voltage VDD and the second power voltage VSS, using an analysis result of the input image data DATA1 of each frame. Also, the controller 140 may provide the first voltage control signal VCS1 to the first power supplier 151.

Also, the controller 140 may determine a bias voltage VREF for measuring a characteristic of the driving transistor, which is changed in real time, through the bias voltage determining unit 143. In real-time sensing, when the level of the first power voltage VDD varies, a value sensed in real time may vary. Accordingly, in order to accurately measure the characteristic of the driving transistor, the controller 140 may control the bias voltage VREF according to a variation of the level of the first power voltage VDD. That is, in order to prevent a fluctuation of the sensing current Ids due to the variation of the level of the first power voltage VDD, the controller 140 may generate a second voltage control signal VCS2 by determining the bias voltage VREF to be suitable for a change range of the level of the first power voltage VDD. Also, the controller 140 may provide the second voltage control signal VCS2 to the second power supplier 152.

As shown in FIG. 4, the bias voltage determining unit 143 may receive, as sensing data DATA_S in a digital form, a sensing current obtained by converting a charge voltage of the sensing capacitor CSEN, which is sensed from the sensing driver 160. In embodiments, the sensing data DATA_S may be received from the ADC shown in FIG. 3. Also, the bias voltage determining unit 143 may receive information on target voltage levels corresponding to reference voltage levels included in a lookup table LUT from a memory 170. Also, the bias voltage determining unit 143 may determine the bias voltage VREF to have a first target voltage level corresponding to a first reference voltage level of the first power voltage VDD with respect to the sensing current in the lookup table LUT.

Figure 5:
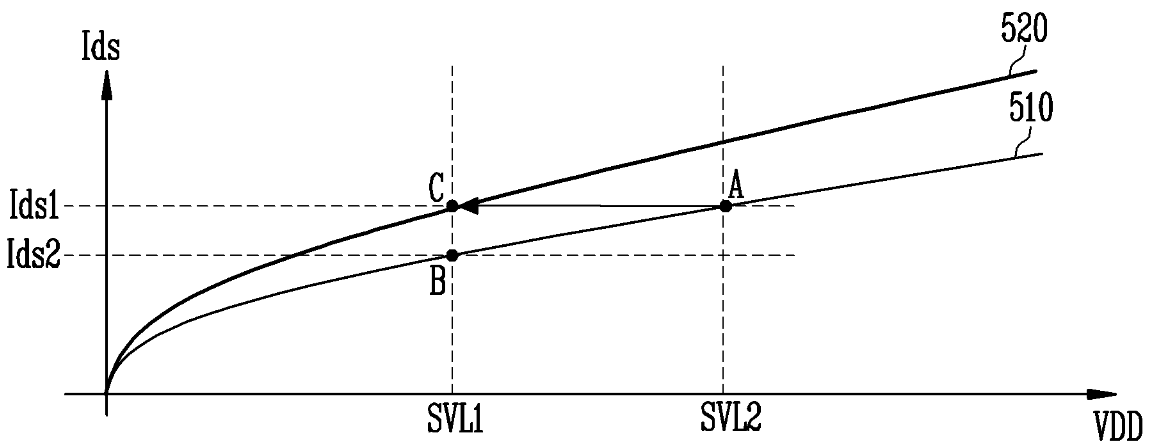
FIG. 5 is a graph illustrating a relationship between a first power voltage related to each of two target voltage levels and a sensing current.

FIG. 5 is a graph illustrating a relationship between a first power voltage related to each of two target voltage levels and a sensing current. In FIG. 5, the horizontal axis represents level of the first power voltage VDD, and the vertical axis represents amount of the sensing current Ids.

Referring to FIG. 5, a first graph 510 represents a relationship between the first power voltage VDD and the sensing current Ids when the bias voltage VREF has a first target voltage level. A second graph 520 represents a relationship between the first power voltage VDD and the sensing current Ids when the bias voltage VREF has a second target voltage level higher than the first target voltage level.

In accordance with an embodiment, when the bias voltage VREF has the first target voltage level, the sensing current Ids may have a first current level Ids1 when the first power voltage VDD has a maximum voltage level SVL2 in a predetermined voltage range (e.g., a voltage range of the first power voltage VDD supported by the display device 100 shown in FIG. 1). In other words, at the maximum voltage level SVL2 of the first power voltage VDD, the sensing current Ids having the first current level Ids1 may flow through the first transistor TR1. However, the voltage level of the first power voltage VDD may be changed to a minimum voltage level SVL1 in a predetermined voltage range according to input image data. When the bias voltage VREF is constantly at the first target voltage level, the current level of the sensing current Ids may be changed to a second current level Ids2 (point B) according to the first graph 510.

That is, as the voltage level of the first power voltage VDD is changed from the maximum voltage level SVL2 (point A) to the minimum voltage level SVL1 (point B) when the bias voltage VREF is constantly maintained at the first target voltage level, the current level of the sensing current Ids may be changed from the first current level Ids1 corresponding to point A to the second current level Ids2 corresponding to point B.

On the other hand, when the voltage level of the bias voltage VREF is changed to the second target voltage level, the sensing current Ids may have the first current level Ids1 (point C) when the first power voltage VDD has the minimum voltage level SVL1 in the predetermined voltage range according to the second graph 520. Therefore, when the voltage level of the bias voltage VREF is adjusted from the first target voltage level to the second target voltage level, the sensing current Ids may have the first current level Ids1 corresponding to point C when the first power voltage VDD has the minimum voltage level SVL1.

As such, even when the voltage level of the first power voltage VDD is changed, the sensing current Ids flowing through the first transistor TR1 of the same pixel may be maintained at the same current level by adjusting the bias voltage VREF. For example, when the voltage level of the first power voltage VDD is changed from the maximum voltage level SVL2 to the minimum voltage level SVL1, the voltage level of the bias voltage VREF may be controlled from the first target voltage level to the second target voltage level.

In addition, a relationship between the first power voltage VDD and the sensing current Ids like the first graph 510 and the second graph 520, which are shown in FIG. 5, may be stored in the form of a lookup table in the memory for each target voltage level. The lookup table will be described in detail later with reference to FIG. 7.

Figure 6:
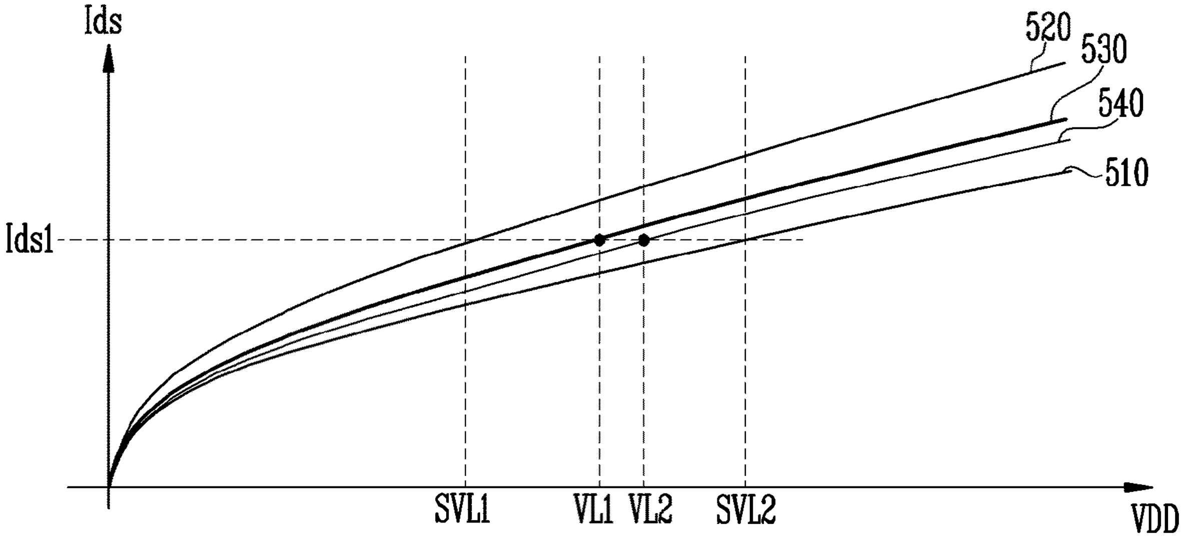
FIG. 6 is a graph illustrating a relationship between the first power voltage related to each of more target voltage levels and the sensing current.

FIG. 6 is a graph illustrating a relationship between the first power voltage related to different target voltage levels and the sensing current.

Referring to FIGS. 1, 2, and 6, the controller 140 may select a reference voltage level that correlates with the level of the first power voltage VDD among one or more reference voltage levels within a variable voltage range of the first power voltage VDD, and adjust the bias voltage VREF to have a target voltage level corresponding to the reference voltage level among target voltage levels.

In accordance with an embodiment, the controller 140 may control the power supplier 150 according to input image data and next input image data, thereby controlling the level of the first power voltage VDD for a next frame period of a frame period. Accordingly, the controller 140 may control, in advance, the bias voltage VREF applied to the data line in a sensing period of the next frame period according to the level of the first power voltage VDD for the next frame period.

As shown in FIGS. 5 and 6, when the first power voltage VDD has the maximum voltage level SVL2 in the predetermined voltage range (e.g., the voltage range of the first power voltage VDD supported by the display device 100 shown in FIG. 1), the sensing current Ids may have the first current level Ids1 according to the first graph 510 when the bias voltage VREF having the first target voltage level is applied. For example, when the first power voltage VDD has 24V which is the maximum voltage level SLV2, the sensing current Ids may be sensed as 5A which is the first current level Ids1 when the bias voltage VREF is applied as 5V which is the first target voltage level.

In addition, when the first power voltage VDD has the minimum voltage level SVL1 in the predetermined voltage range, the sensing current Ids may have the first current level Ids1 according to the second graph 520 when the bias voltage VREF having the second target voltage level is applied. For example, when the first power voltage VDD is 20V as the minimum voltage level SLV1, the sensing current Ids may be constantly sensed as 5A which is the first current level Ids1 when the bias voltage VREF is applied as 10V which is the second target voltage level.

When the voltage level of the first power voltage VDD is changed to a first reference voltage level VL1 between the minimum voltage level SVL1 and the maximum voltage level SVL2, the sensing current Ids may be sensed to be at a changed current level. In response to the changing current level Ids, the bias voltage VREF may be dynamically adjusted to maintain the sensing current Ids at the first current level Ids1. As used herein, "dynamic adjustment" refers to adjustment that happens in real-time in response to continual or continuous sensing of the sensing current Ids. For example, the bias voltage VREF may be adjusted to have a third target voltage level corresponding to a third graph 530. The third target voltage level may be a target voltage level corresponding to the third graph 530, which generates the first sensing current Ids1 at the first reference voltage level VL1. For example, when the first power voltage VDD has 22V which is the first reference voltage level VL1, the bias voltage VREF may be selected to have 7V which is the third target voltage level, so that the sensing current to be applied can be constantly sensed as 5A which is the first current level Ids1.

Also, when the voltage level of the first power voltage VDD is changed to a second reference voltage level VL2 between the first reference voltage level VL1 and the maximum voltage level SVL2 in the next frame period, the sensing current Ids may be sensed at a newly changed current level. In response to this newly changed current level, the bias voltage VREF may be dynamically re-adjusted to maintain the sensing current Ids at the first current level Ids1. The bias voltage VREF may be controlled to have a fourth target voltage level corresponding to a fourth graph 540. The fourth target voltage level may be a target voltage level corresponding to the fourth graph 540 matched to the first sensing current Ids and the second reference voltage level VL2. For example, when the first power voltage VDD has 21V which is the second reference voltage level VL2, the bias voltage VREF may be controlled to have 9V which is the fourth target voltage level, so that the sensing current Ids to be applied can be constantly sensed as 5A which is the first current level Ids1.

Referring to FIG. 6, when the first power voltage VDD has the same reference voltage level, the sensing current Ids flowing through the first transistor TR1 may be sensed at a higher current level as the bias voltage VREF is applied at a higher target voltage level. In addition, when the reference voltage level of the first power voltage VDD decreases, the sensing current Ids flowing through the first transistor TR1 may be sensed at the same current level only when the bias voltage VREF is to be applied at a high target voltage level.

As such, in order to constantly maintain the sensing current Ids as the first power voltage VDD decreases, the bias voltage VREF is to be controlled to have a high target voltage level. For example, when the first power voltage VDD decreases from 24V to 22V, the bias voltage VREF may be controlled from 5V to 7V. In addition, the sensing current Ids may be constantly sensed as 5A.

Thus, the controller 140 controls the bias voltage VREF to have an optimum voltage level suitable for the first power voltage VDD applied to each frame in real-time sensing, so that a change in the first power voltage VDD can be compensated, thereby constantly maintaining the sensing current Ids. In addition, the characteristic of the driving transistor can be more accurately measured through the same sensing current Ids.

FIG. 7 is a diagram illustrating an embodiment of a lookup table including levels of the first power voltage with respect to each sensing current and target voltage levels corresponding thereto.

Referring to FIG. 7, the display device 100 may include a memory which stores target voltage levels VREF_TL1 to VREF_TLmn respectively corresponding to one or more reference voltage levels VDD1 to VDDn within a predetermined voltage range of the first power voltage VDD. In addition, the one or more reference voltage levels VDD1 to VDDn and the target voltage levels VREF_TL1 to VREF_TLmn may be stored in the form of a lookup table LUT in the memory. In accordance with an embodiment, the lookup table LUT may include target voltage levels VREF_TL1 to VREF_TLmn respectively correspond to one or more reference voltage levels VDD1 to VDDn in relation to each current level (e.g., Ids1) of the sensing current. In FIG. 7, target voltage levels VREF_TL1 to VREF_TLmn respectively corresponding to reference voltage levels VDD1 to VDDn in relation to each of first to mth current levels Ids1 to Idsm are illustrated.

In accordance with an embodiment, the lookup table LUT stored in the memory may include a reference voltage level of the first power voltage VDD, a current amount of the sensing current Ids, and a target voltage level VREF_TL of the bias voltage VREF. Also, the lookup table LUT may store a representative value commonly applied to all pixels such that corresponding values are easily applied to a product, or store values divided according to a pixel unit or a block unit.

Also, the lookup table LUT stored in the memory may be updated for each predetermined cycle. The driving transistor included in each pixel PX may function differently as it ages. Accordingly, before a product is released, the lookup table LUT is updated for each cycle, so that the target voltage level VREF_TL of the bias voltage VREF is updated to reflect any change due to degradation of the driving transistor. In an embodiment, a cycle in which the lookup table LUT is updated may be set to a period in which a certain amount of change may occur to the driving transistor. The corresponding cycle may be 1000 hours, but the present disclosure is not limited thereto.

In accordance with an embodiment, the controller 140 may control the bias voltage VREF to have a target voltage level VREF_TL matched from the lookup table LUT. The target voltage level VREF_TL may be a voltage level which becomes a reference for controlling the bias voltage VREF, corresponding to a reference voltage level of the first power voltage VDD and a sensing current Ids sensed as an electrical characteristic, which are provided for each frame. For example, when the reference voltage level of the first power voltage VDD is 24V with reference to the same sensing current Ids, the target voltage level VREF_TL matched from the lookup table LUT stored in the memory may be 5V. In addition, when the reference voltage level of the first power voltage VDD is 22V, the target voltage level VREF_TL matched from the lookup table LUT stored in the memory may be 7V. However, this is merely illustrative, and the present disclosure is not limited thereto.

Figure 8:
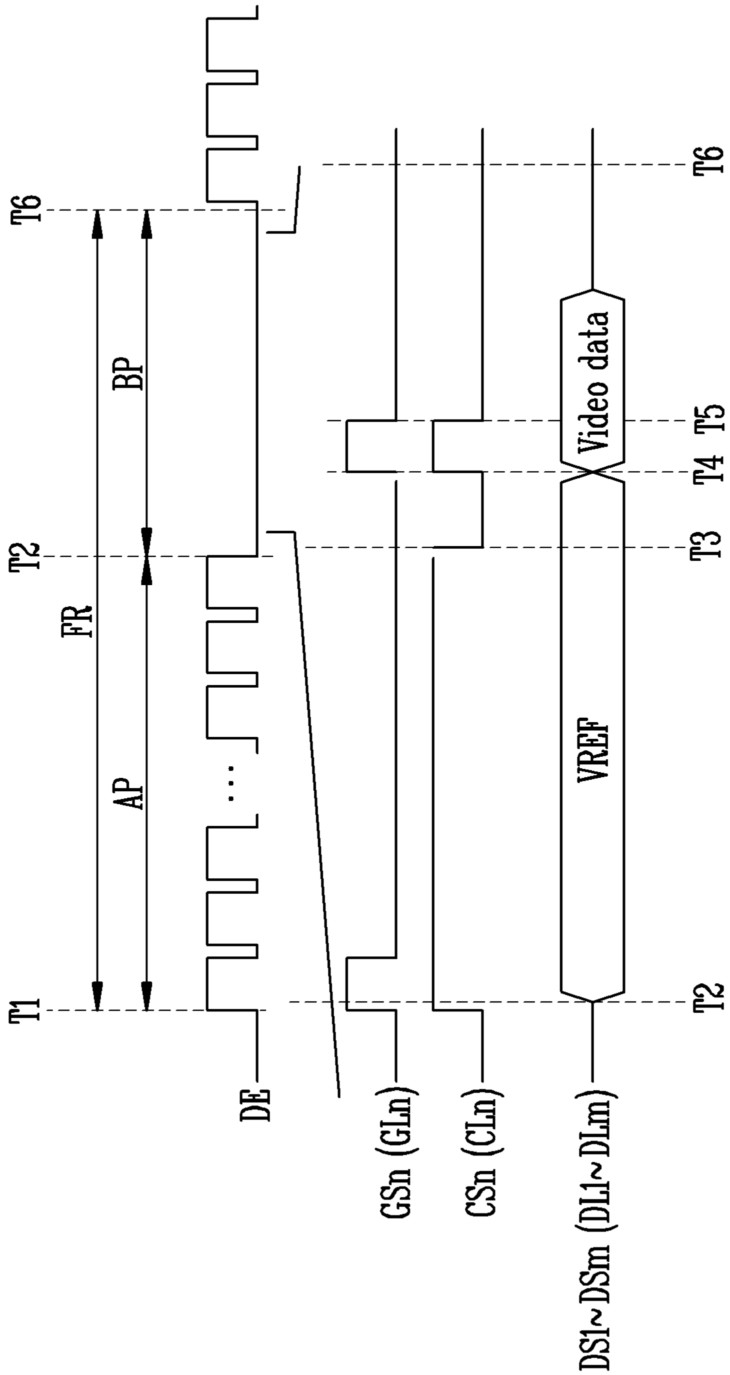
FIG. 8 is a timing diagram illustrating an embodiment of signals of the display device shown in FIG. 1 in one frame period.

FIG. 8 is a timing diagram illustrating an embodiment of signals of the display device shown in FIG. 1 in one frame period.

Referring to FIG. 8, driving of each pixel PX may be performed by using a frame period FR as a unit. The frame period FR may include a display period AP, and a sensing period BP between adjacent display periods AP.

A data enable signal DE defines the display period AP (e.g., an active period) in which image data is input, and hence a period in which the data enable signal DE is not applied may be the sensing period BP (e.g., a vertical blank period).

Referring to FIGS. 3 and 8, in the display period AP between a first time T1 and a second time T2, an nth gate signal GSn may be supplied to the second transistor TR2 through the nth gate line GLn, and an nth control signal CSn may be supplied to the third transistor TR3 through the nth control line CLn. Accordingly, the second transistor TR2 may be turned on, so that the data voltage VDATA is transferred to the first node N1. In addition, the third transistor TR3 may be turned on, so that the initialization voltage VINIT is transferred to the second node N2.

A voltage corresponding to a difference between the data voltage VDATA and the initialization voltage VINIT may be stored in the storage capacitor Cst. Accordingly, the first transistor TR1 may apply a current corresponding to the voltage stored in the storage capacitor Cst to the light emitting element LD. Therefore, the light emitting element LD may generate light with a predetermined luminance.

In the sensing period BP between the second time T2 to a sixth time T6, driving of at least one pixel PX may include a sensing period and a data rewriting period. That is, the display device may select at least one pixel PX for each sensing period BP, thereby sensing a characteristic of the pixel PX, and re-apply the data voltage VDATA for recovering an image display state after the sensing to an image display state before the sensing.

A period between the second time T2 and a third time T3 may be provided as the sensing period. In the period between the second time T2 and the third time T3, the bias voltage VREF may be supplied as data signals DS1 to DSm applied to the data lines DL1 to DLm. The second transistor TR2 may be turned on according to the nth gate signal GSn enabled to a high level, and therefore, the bias voltage VREF may be supplied to the first node N1. The third transistor TR3 may be turned on according to the nth control signal CSn enabled to the high level, so that the initialization voltage VINIT is supplied to the second node N2 during a predetermined period. In addition, as the initialization switch SW_VINIT of the sensing driver 160 is turned off after the predetermined period elapses, the second node N2 may be floated. The sensing driver 160 may sense a characteristic of the driving transistor (e.g., a voltage charged in the sensing capacitor CSEN) from the second node N2.

After that, a period between a fourth time T4 and a fifth time T5 is the data rewriting period. In order to recover the image display state after the sensing to the image display device before the sensing, the data voltage VDATA may be re-supplied to the first node N1 by turning on the second transistor TR2, and the initialization voltage VINIT may be supplied to the second node N2 by turning on the third transistor TR3.

In an embodiment, as the voltage of the second node N2 increases due to light emission of the light emitting element LD in the display period AP prior to the sensing period, a difference between a driving current supplied by the first transistor TR1 in the display period AP prior to the sensing period and a driving current supplied by the first transistor TR1 in the data rewriting period posterior to the sensing period can be reduced when the data voltage VDATA is re-applied to the first node N1 to correspond to the initialization voltage VINIT transferred to the second node N2 in the data rewriting period posterior to the sensing period. That is, in the display device, a visibility phenomenon which may occur due to real-time sensing using an external compensation circuit can be reduced or prevented.

Figure 9:
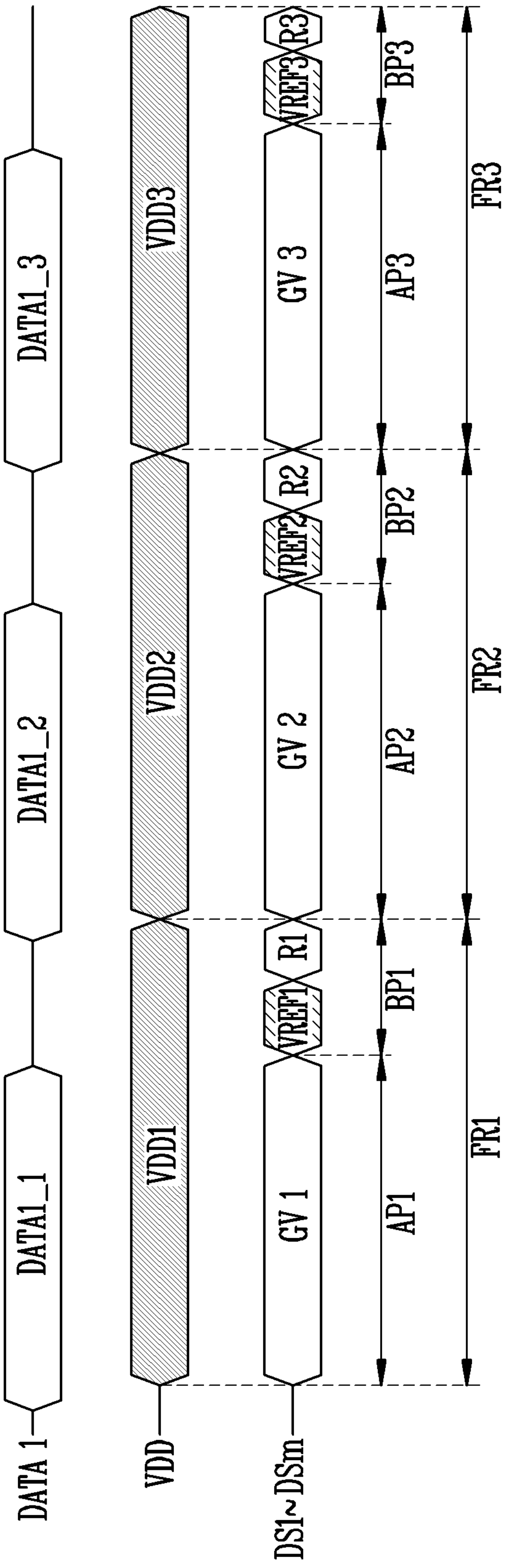
FIG. 9 is a timing diagram illustrating an embodiment of signals of the display device shown in FIG. 1 in a plurality of frame periods.

FIG. 9 is a timing diagram illustrating an embodiment of signals of the display device shown in FIG. 1 in a plurality of frame periods.

Hereinafter, an example in which the display device operates by using, as a unit, a frame period FR including a display period AP and a sensing period BP will be described with reference FIGS. 1 and 9. An operation shown in FIG. 9 is identical to the operation in a single frame period, which is described with reference to FIG. 8, and therefore, overlapping descriptions will be omitted.

Referring to FIGS. 1 and 9, first image data DATA1_1 may be received as the input image data DATA1 in a first frame period FR1. According to the first image data DATA1_1, first gray voltages GV1 may be applied as the data signals DS1 to DSm to the data lines DL1 to DLm.

The controller 140 may control the power supplier 150, thereby providing the first power voltage VDD applied during a first display period AP1 and a first sensing period PB1 to have a first reference voltage level VDD1. Also, the controller 140 may control the power supplier 150, thereby controlling the bias voltage VREF applied as the data signals DS1 to DSm during a sensing period included in the first sensing period BP1 to have a first target voltage level VREF1 according to the first reference voltage level VDD1 of the first power voltage VDD. In addition, a first data voltage R1 may be provided as the data signals DS1 to DSm during a data rewriting period included in the first sensing period BP1 so as to recover an image display state after sensing to an image display state before the sensing. In some embodiments, the first data voltage R1 may equal to the first gray voltages GV1. More specifically, when the input image data in the first frame period FR1 is a white image of 100%, the controller 140 may provide the first power voltage VDD applied during the first frame period FR1 to have 24V which is a maximum voltage level within a variable voltage range. Accordingly, the controller 140 may control the bias voltage VREF applied in the first sensing period BP1 of the first frame period FR1 to have 5V which is a target voltage level corresponding to 24V of the first power voltage VDD.

In addition, second image data DATA1_2 may be received as the input image data DATA1 in a second frame period FR2 as a next frame period of the first frame period FR1. According to the second image data DATA1_2, second gray voltages GV2 may be applied as the data signals DS1 to DSm to the data lines DL1 to DLm.

The controller 140 may control the power supplier 150, thereby providing the first power voltage VDD applied during a second display period AP2 and a second sensing period PB2 to have a second reference voltage level VDD2 from the first reference voltage level VDD1. Also, the controller 140 may control the power supplier 150, thereby controlling the bias voltage VREF applied as the data signals DS1 to DSm during a sensing period included in the second sensing period BP2 to have a second target voltage level VREF2 according to the second reference voltage level VDD2 of the first power voltage VDD. In addition, a second data voltage R2 may be provided as the data signals DS1 to DSm during a data rewriting period included in the second sensing period BP2 so as to recover an image display state after sensing to an image display state before the sensing. In embodiments, the second data voltage R2 may equal to the second gray voltages GV2. More specifically, when the input image data in the second frame period FR2 is a white image of 1%, the controller 140 may provide the first power voltage VDD applied during the second frame period FR2 to have 22V which is decreased from the maximum voltage level. Accordingly, the controller 140 may control the bias voltage VREF applied in the second sensing period BP2 of the second frame period FR2 to have 7V which is a target voltage level corresponding to 22V as the level of the first power voltage VDD.

In addition, third image data DATA1_3 may be received as the input image data DATA1 in a third frame period FR3 as a next frame period following the second frame period FR2. According to the third image data DATA1_3, third gray voltages GV3 may be applied as the data signals DS1 to DSm to the data lines DL1 to DLm.

The controller 140 may control the power supplier 150, thereby providing the first power voltage VDD applied during a third display period AP3 and a third sensing period PB3 to have a third reference voltage level VDD3 from the second reference voltage level VDD2 from the first reference voltage level VDD1. Also, the controller 140 may control the power supplier 150, thereby controlling the bias voltage VREF applied as the data signals DS1 to DSm during a sensing period included in the third sensing period BP3 to have a third target voltage level VREF3 according to the third reference voltage level VDD3 of the first power voltage VDD. In addition, a third data voltage R3 may be provided as the data signals DS1 to DSm during a data rewriting period included in the third sensing period BP3 so as to recover an image display state after sensing to an image display state before the sensing. In embodiments, the third data voltage R3 may equal to the third gray voltages GV3. More specifically, when the input image data in the third frame period FR3 is also a white image of 100%, the controller 140 may provide the first power voltage VDD applied during the third frame period FR3 to have 24V which is the maximum voltage level. Accordingly, the controller 140 may control the bias voltage VREF applied in the third sensing period BP3 of the third frame period FR3 to have 5V which is a target voltage level corresponding to 24V as the level of the first power voltage VDD.

Thus, in real-time sensing, the controller 140 may compensate for the bias voltage VREF, based on a pre-stored target voltage level according to the first power voltage VDD varying according to input image data. Accordingly, unlike the varying first power voltage VDD, the sensing current Ids is constantly maintained, so that the display device 100 can more accurately sense a characteristic of the driving transistor and prevent, in advance, degradation of the driving transistor due to a fluctuation of the sensing current Ids.

Figure 10:
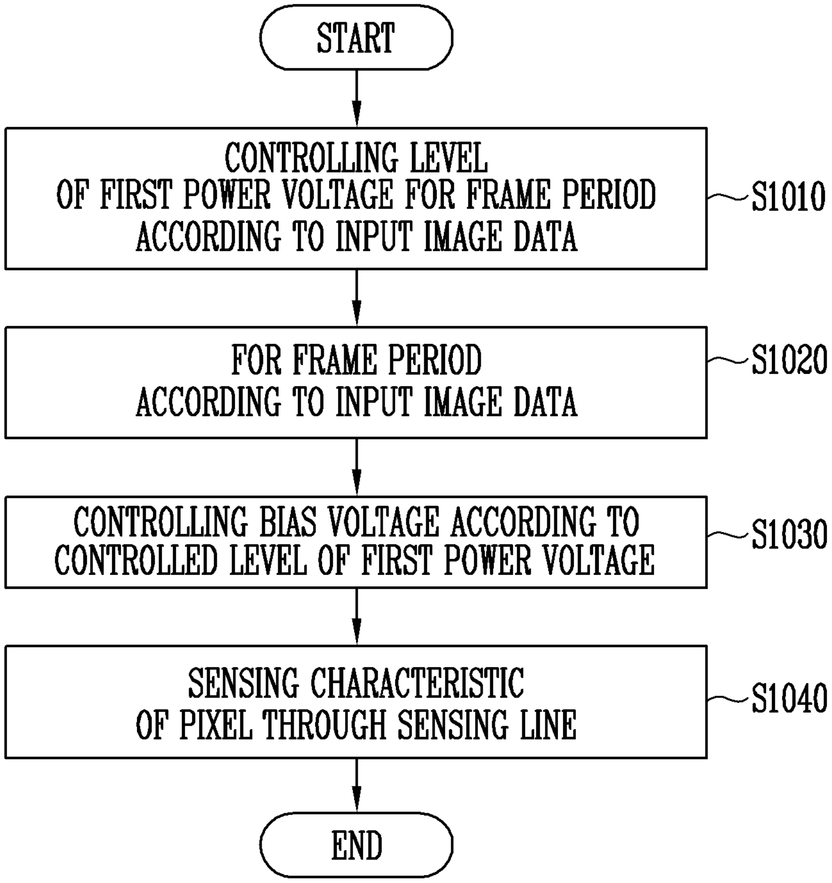
FIG. 10 is a flowchart illustrating a method of driving the display device in accordance with an embodiment of the present disclosure.

FIG. 10 is a flowchart illustrating a method of driving the display device in accordance with an embodiment of the present disclosure. Hereinafter, a method will be described, in which the display device including a pixel which is connected to a data line and a sensing line and has a light emitting element connected between a first power voltage node and a second power voltage node controls a bias voltage according to a controlled level of a first power voltage.

Referring to FIGS. 1 and 10, in step S1010, the display device 100 may control the level of a first power voltage VDD for a frame period according to input image data DATA1. The display device 100 may provide a first power voltage VDD and a second power voltage VSS respectively to a first power voltage node and second power voltage node, which are connected to a pixel PX in the frame period. For example, the display device 100 may control the power supplier 150 according to input image data DATA1 of a frame period FR, thereby controlling a level of the first power voltage VDD for the corresponding frame period FR. Accordingly, the display device 100 may provide the controlled level of the first power voltage VDD to the pixel PX during a display period AP and a sensing period BP of the corresponding frame period FR.

In step S1020, the display device 100 may apply a bias voltage VREF to a data line. For example, the display device 100 may apply the bias voltage VREF to the pixel PX through the data line, and the bias voltage VREF may be provided to the pixel PX during the sensing period BP of the corresponding frame period FR. The display device 100 may provide the bias voltage VREF to the pixel PX so as to measure a characteristic a driving transistor included in the pixel PX. However, the bias voltage VREF may be applied as a voltage determined based on the level of the first power voltage VDD provided during the frame period FR.

In step S1030, the display device 100 may control the bias voltage VREF according to the controlled voltage level of the first power voltage VDD. When sensing is performed by applying the bias voltage VREF, a sensing current for sensing the characteristic of the driving transistor may be changed as the first power voltage VDD varies according to the input image data DATA1 changed for each frame period FR. Accordingly, it is necessary to prevent a fluctuation of the sensing current due to the variation of the first power voltage VDD by controlling and applying, by the display device 100, the bias voltage VREF according to the variation of the first power voltage VDD.

The display device 100 may control the bias voltage VREF provided to the pixel PX during the sensing period PB by using target voltage levels respectively corresponding to one or more reference voltage levels within a voltage range of the first power voltage VDD. The display device 100 may select a first reference voltage level matched to the controlled level of the first power voltage VDD among the one or more reference voltage levels, and control the bias voltage VREF to have a first target voltage level corresponding to the first reference voltage among the target voltage levels. For example, the display device 100 may control a level of the first power voltage VDD for a next frame period according to next input image data of the input image data, and control the bias voltage VREF applied to the data line in a sensing period BP of the next frame period according to the level of the first power voltage VDD for the next frame period. That is, the display device 100 may select a second reference voltage level matched to the level of the first power voltage VDD for the next frame period, and control the bias voltage VREF to having a second target voltage level corresponding to the second reference voltage level among the target voltage levels.

Also, the display device 100 may store target voltage levels corresponding to one or more reference voltage levels within a predetermined voltage range of the first power voltage VDD so as to control the bias voltage VREF. The display device 100 may pre-store reference voltage levels and target voltage levels. The reference voltage levels and the target voltage levels may be stored in the form of a lookup table with respect to a specific value sensed as an electrical characteristic. In addition, the lookup table may be stored before a product is released, and be updated for each predetermined cycle.

In step S1040, the display device 100 may sense an electrical characteristic of the pixel PX through a sensing line. For example, the display device 100 may apply the bias voltage VREF to the pixel PX through the sensing line, and sense a charge voltage of a sensing capacitor CSEN by applying the bias voltage VREF during the sensing period BP of the corresponding frame period FR. The charge voltage of the sensing capacitor CSEN may be a voltage charged by the sensing current for a certain time by applying the bias voltage VREF.

The display device 100 may sense a first value as the electrical characteristic of the pixel PX through the sensing line when the first power voltage VDD has the first reference voltage level and the bias voltage VREF has the first target voltage level corresponding to the first reference voltage level. Also, the display device 100 may sense a second value as the electrical characteristic of the pixel PX through the sensing line when the first power voltage VDD has the second reference voltage level and the bias voltage VREF has the second target voltage level corresponding to the second reference voltage level. The first value and the second value correspond to a sensing current Ids, and may be the same.

In accordance with the present disclosure, there can be provided a display device capable of performing sensing with improved reliability and a driving method of the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a pixel including a first transistor having a drain electrode that is connected to a first power voltage node and a source electrode that is connected to a second power voltage node, a second transistor connected between a data line and a gate electrode of the first transistor, and a third transistor connected between a sensing line and the source electrode of the first transistor;

a data driver connected to the pixel through the data line, the data driver applying a bias voltage to the data line during a sensing period of a frame period, wherein the frame period includes the sensing period and a display period;

a sensing driver connected to the pixel through the sensing line, the sensing driver sensing an electrical characteristic of the pixel through the sensing line during the sensing period; and a controller configured to control a first power voltage for the frame period according to input image data, and adjust the bias voltage according to the first power voltage and the electrical characteristic of the pixel.

2. The display device of claim 1, further comprising a memory configured to store target voltage levels respectively corresponding to one or more reference voltage levels within a predetermined voltage range.

3. The display device of claim 2, wherein the one or more reference voltage levels and the target voltage levels are stored in the form of a lookup table in the memory.

4. The display device of claim 2, wherein the one or more reference voltage levels and the target voltage levels are stored in the form of a lookup table with respect to a specific value sensed as the electrical characteristic in the memory.

5. The display device of claim 4, wherein the lookup table is updated for each predetermined cycle.

6. The display device of claim 1, wherein the controller selects a first reference voltage level among one or more reference voltage levels, wherein the first reference voltage level is selected based on a level of the first power voltage, and adjusts the bias voltage to a first target voltage level corresponding to the first reference voltage level among target voltage levels.

7. The display device of claim 6, wherein the controller controls the level of the first power voltage for a next frame period of the frame period according to next input image data of the input image data, and adjusts the bias voltage applied to the data line during the sensing period of the next frame period according to the level of the first power voltage for the next frame period.

8. The display device of claim 7, wherein the controller selects a second reference voltage level based on the level of the first power voltage for the next frame period among the one or more reference voltage levels, and adjusts the bias voltage to have a second target voltage level corresponding to the second reference voltage level among the target voltage levels.

9. The display device of claim 8, wherein the second reference voltage level is different from the first reference voltage level, and the second target voltage level is different from the first target voltage level.

10. The display device of claim 1, wherein a first value is sensed as the electrical characteristic of the pixel through the sensing line when the first power voltage has a first reference voltage level among reference voltage levels and the bias voltage has a first target voltage level corresponding to the first reference voltage level among target voltage levels, wherein a second value is sensed as the electrical characteristic of the pixel through the sensing line when the first power voltage has a second reference voltage level among the reference voltage levels and the bias voltage has a second target voltage level corresponding to the second reference voltage level among the target voltage levels, and wherein the first value and the second value are the same.

11. The display device of claim 1, wherein the data driver supplies a data voltage corresponding to the input image data to the pixel in the display period.

12. A method of driving a display device that includes a pixel including a first transistor having a drain electrode that is connected to a first power voltage node and a source electrode that is connected to a second power voltage node, a second transistor connected between a data line and a gate electrode of the first transistor, and a third transistor connected between a sensing line and the source electrode of the first transistor, wherein the method comprises:

providing a first power voltage and a second power voltage, respectively, to the first power voltage node and the second power voltage node in a frame period, wherein the first power voltage for the frame period changes according to input image data, and the frame period includes a display period and a sensing period;

applying a bias voltage to the data line during the sensing period; and sensing an electrical characteristic of the pixel through the sensing line in the sensing period, adjusting the bias voltage according to the first power voltage and the electrical characteristic of the pixel.

13. The method of claim 12, further comprising storing target voltage levels corresponding to one or more reference voltage levels within a predetermined voltage range.

14. The method of claim 12, wherein the adjusting of the bias voltage includes:

selecting a first reference voltage level based on a level of the first power voltage among one or more reference voltage levels; and controlling the bias voltage to have a first target voltage level corresponding to the first reference voltage level among target voltage levels.

15. The method of claim 14, further comprising:

controlling the level of the first power voltage for a next frame period of the frame period according to next input image data of the input image data; and adjusting the bias voltage applied to the data line during the sensing period of the next frame period according to the level of the first power voltage for the next frame period.

16. The method of claim 15, wherein the adjusting of the bias voltage applied to the data line in the sensing period of the next frame period includes:

selecting a second reference voltage level based on the level of the first power voltage for the next frame period among the one or more reference voltage levels; and adjusting the bias voltage to have a second target voltage level corresponding to the second reference voltage level among the target voltage levels.

17. The method of claim 16, wherein the second reference voltage level is different from the first reference voltage level, and the second target voltage level is different from the first target voltage level.

18. The method of claim 12, wherein a first value is sensed as the electrical characteristic of the pixel through the sensing line when the first power voltage has a first reference voltage level among reference voltage levels and the bias voltage has a first target voltage level corresponding to the first reference voltage level among target voltage levels, wherein a second value is sensed as the electrical characteristic of the pixel through the sensing line when the first power voltage has a second reference voltage level among the reference voltage levels and the bias voltage has a second target voltage level corresponding to the second reference voltage level among the target voltage levels, and wherein the first value and the second value are the same.

* * * * *